United States Patent [19]
Bingo et al.

[11] Patent Number: 4,833,280
[45] Date of Patent: May 23, 1989

[54] SLIDE SWITCH HAVING IMPROVED HOLDING STRUCTURE FOR THE MOVABLE CONTACT

[75] Inventors: Hideyuki Bingo, Uji; Takashi Yoshimura, Mishima; Masatsugu Yamashita, Kyoto; Shinichi Hashizume, Kusatsu; Norio Iwakiri, Otokuni, all of Japan

[73] Assignee: Omron Tateisi Electronics Co., Kyoto, Japan

[21] Appl. No.: 144,222

[22] Filed: Jan. 15, 1988

Related U.S. Application Data

[60] Division of Ser. No. 894,044, Aug. 7, 1986, which is a continuation of Ser. No. 651,761, Sep. 18, 1984, Pat. No. 4,628,166.

[30] Foreign Application Priority Data

| Sep. 19, 1983 | [JP] | Japan | 58-173946 |
| Sep. 19, 1983 | [JP] | Japan | 58-145162[U] |
| Sep. 19, 1983 | [JP] | Japan | 58-145163[U] |
| Sep. 21, 1983 | [JP] | Japan | 58-147164[U] |

[51] Int. Cl.[4] .................................... H01H 15/02
[52] U.S. Cl. ................................................ 200/16 D
[58] Field of Search ............... 200/16 D, 333, 334, 200/16 R, 16 C, 16 B

[56] References Cited

U.S. PATENT DOCUMENTS

| 3,485,966 | 12/1969 | Bailey | 200/16 D |
| 3,843,852 | 10/1974 | Lockard | 200/16 D |
| 3,974,346 | 8/1976 | Keprda | 200/333 X |
| 4,012,608 | 3/1977 | Lockard | 200/16 D |
| 4,029,917 | 6/1977 | Webster | 200/16 D X |
| 4,168,404 | 9/1979 | Lockard | 200/16 D X |
| 4,324,956 | 4/1982 | Sakakino et al. | 200/16 R |
| 4,324,958 | 4/1982 | Valleau | 200/16 F |
| 4,376,234 | 3/1983 | Liataud | 200/16 R |

FOREIGN PATENT DOCUMENTS

| 1617755 | 11/1950 | Fed. Rep. of Germany . |
| 6937798 | 1/1970 | Fed. Rep. of Germany . |
| 2052870 | 1/1981 | United Kingdom . |

*Primary Examiner*—J. R. Scott
*Attorney, Agent, or Firm*—Stevens, Davis, Miller & Mosher

[57] ABSTRACT

This slide switch includes: a casing formed in a hollow box shape with an open top; several fixed contacts on the bottom surface of the casing and several terminals connected to them extending to the outside of the casing; a cover mounted to close the open top of the casing, formed with a hole opposed to the fixed contacts; and a slide member disposed inside the casing, which has a control portion protruding out through the hole in the cover and a movable contact portion made of a resilient electrically conducting material which bears against the internal bottom surface of the casing and thereby produces a biasing force on the slide member to impel it in the direction towards the cover. The movable contact portion of the slide member, according as the control portion of the slide member is moved from outside the casing, selectively connects together a combination of the fixed contacts. The movable contact is mounted to the slider so that movement of the contact within a plane parallel to the bottom surface of the casing is solely restricted to the sliding direction of the slider.

6 Claims, 12 Drawing Sheets

SLIDE SWITCH HAVING IMPROVED HOLDING STRUCTURE FOR THE MOVABLE CONTACT

This is a division of application Ser. No. 894,044 filed Aug. 7, 1986 which in turn is a continuation of application Ser. No. 651,761, filed Sept. 18, 1984, now U.S. Pat. No. 4,628,166.

BACKGROUND OF THE INVENTION

The present invention relates to a slide switch, and in particular to a slide switch such as a DIP switch which is suitable for being directly mounted to a printed circuit board for setting up data thereon.

Mounting a slide switch such as a DIP switch to a printed circuit board is typically done by performing automatic soldering. After completion of the automatic soldering process, it is usual for solder residues and so on to be adhered to the printed circuit board, and accordingly it is conventionally practiced to wash off such residues and the like by cleansing the printed circuit board in a cleaning liquid such as Freon.

However, during such a cleansing process, impurities are naturally carried off in the cleansing liquid, and there is a risk that the cleansing liquid may carry these impurities into a slide switch such as DIP switch fixed to the printed circuit board. Such impurities, if they settle on the contacts of the slide switch, can cause the contacting of the contacts to be deteriorated, and this can give rise to trouble during the use of the slide switch. Accordingly, there is a requirement for a sealing structure to be provided for such a slide switch for keeping cleansing fluid out of it during the cleansing process of the printed circuit board.

Now, one known type of such seal structure has the contacts of the slide switch tightly enclosed by a seal member, with a drive portion provided on the upper surface of this seal member so as to allow the contacts to be operated through the seal member. However, in the case of this construction, the problems arise that cleansing fluid is abstracted, because it can settle on and adhere to the seal member surface. Further, during the soldering process for fixing the slide switch to the printed circuit board, heat can be directly transferred to the seal member via the terminals of the slide switch and via its contacts, and this can risk deformation of or damage to the seal member. Further, in such a case, deformation of the movable contacts of the slide switch could occur as a result of deformation of the seal member, and also the force required for operation of the slide switch is altered, as compared to the case in which the contacts of the switch are directly driven not through the seal member, which can unduly deteriorate the operability of the slide switch.

Further, there is another known method for preventing entry of cleansing fluid or contaminants into the slide switch, when a printed circuit board to which it is mounted is being cleansed, in which a separate member is provided for protecting the drive portion of the slide switch while the cleansing is being performed, since it is through this drive portion that the cleansing fluid tends to enter the switch. However, when such a separate member is used for preventing ingress of cleaning fluid, such a preliminary to the the cleansing process is troublesome, and further the requirement arises for removal of such a separate member from the printed circuit board and the slide switch mounted thereon after the cleansing process is completed, which causes further trouble. And because of this trouble the cleansing process becomes more costly.

SUMMARY OF THE INVENTION

Accordingly, it is the primary object of the present invention to provide a slide switch which has a good and effective seal structure.

It is a further object of the present invention to provide such a slide switch which is not liable to entry of cleansing fluid or contaminants, when a printed circuit board to which it is mounted is being cleansed.

It is a further object of the present invention to provide such a slide switch which is not liable to contamination of its contacts occurring, when a printed circuit board to which it is mounted is being cleansed.

It is a further object of the present invention to provide such a slide switch which does not require the application of any separate member or seal system to it for keeping out cleansing fluid from its interior, when a printed circuit board to which it is mounted is being cleansed.

It is a further object of the present invention to provide such a slide switch which has a seal structure which is not liable to deformation or damage due to heat transferred to it, when said slide switch is being soldered to a printed circuit board.

It is further object of the present invention to provide such a slide switch which is not liable to deformation of any of its contact members.

It is a further object of the present invention to provide such a slide switch which does not require too much switching force for its operation.

It is a further object of the present invention to provide such a slide switch with good operability.

It is a further object of the present invention to provide such a slide switch which has a positive detent action for its operation.

It is a further object of the present invention to provide such a slide switch which does not suffer from undue friction occurring between a seal member thereof and a switching member which slidingly moves against said seal member during switching of said slide switch.

It is a yet further object of the present invention to provide such a slide switch which is easy to manufacture.

It is a yet further object of the present invention to provide such a slide switch which is economical to manufacture.

It is a yet further object of the present invention to provide such a slide switch which is cheap to use.

It is a yet further object of the present invention to provide such a slide switch which is reliable.

It is a yet further object of the present invention to provide such a slide switch which is compact.

It is a yet further object of the present invention to provide such a slide switch which is strong.

According to the present invention, these and other objects are accomplished by a slide switch characterized by comprising; (a) a casing formed in a hollow box shape with an open top; (b) a plurality of fixed contacts on the internal bottom surface of said casing; (c) a plurality of terminals extending to the outside of said casing, each one of said terminals being electrically connected to a one of said fixed contacts; (d) a cover mounted to close said open top of said casing, formed with a hole opposed to said fixed contacts; and (e) a slide member disposed inside said casing, comprising a control portion protruding out through said hole in said cover, and a movable contact portion made of a resilient electrically conducting material which bears against said internal bottom surface of said casing and thereby produces a biasing force on said slide member to impel it in the direction towards said cover; (f) said movable contact portion of said slide member, according as said control portion of said slide member is moved from outside said casing, selectively electrically connecting together a combination of said fixed contacts. Further, this slide switch may be further characterized by comprising a seal member interposed between the internal side of said cover and the side of said slide member facing it, said seal member being squeezed between said slide member and said cover, a seal between the inside of the casing and the outside thereby being produced.

According to such a structure, because the seal member is interposed between the internal side of said cover and the side of said slide member facing it, thereby said seal member is squeezed between said slide member and said cover, and accordingly a seal is produced between the inside of the casing and the outside, more specifically between the side of the slide member facing the cover and the periphery of said hole in said cover through which said control portion of said slide member projects. Thereby, because the slide switch itself has a good and effective seal structure, it is not liable to entry of cleansing fluid or contaminants, when a printed circuit board to which it is mounted is being cleansed, and accordingly it is not liable to contamination of its contacts occurring during such cleansing, without requiring the application of any separate member or seal system to it for keeping out cleansing fluid from its interior during cleansing. Further, this seal structure is not liable to deformation or damage due to heat transferred to it, when said slide switch is being soldered to a printed circuit board, due to the fact that the slide member is interposed between the seal member and the fixed contacts which are connected to the terminals. Accordingly, the slide switch is not liable to deformation of any of its contact members, and also does not require too much switching force for its operation. Thus, it has good operability. Further, this slide switch is easy and economical to manufacture, is cheap to use, and is reliable.

Further, according to a more particular aspect of the present invention, these and other objects are more particularly and concretely accomplished by a slide switch as specified above, further comprising a detent means for retaining said slide member at certain particular standard positions relative to said casing. Typically, this detent mechanism retains the slide member at an ON or an OFF position.

Further, according to a yet more particular aspect of the present invention, these and other objects are yet more particularly and concretely accomplished by a slide switch as specified above, further comprising a friction releasing means for biasing said slide member away from said casing so as to release the squeezing of said seal member therebetween when said slide member is at other than certain particular standard positions relative to said casing. This ensures that when the slide member is being slid from one position to another, it does not unduly rub against said seal member; and accordingly durability is promoted.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENTS

Figure 1:
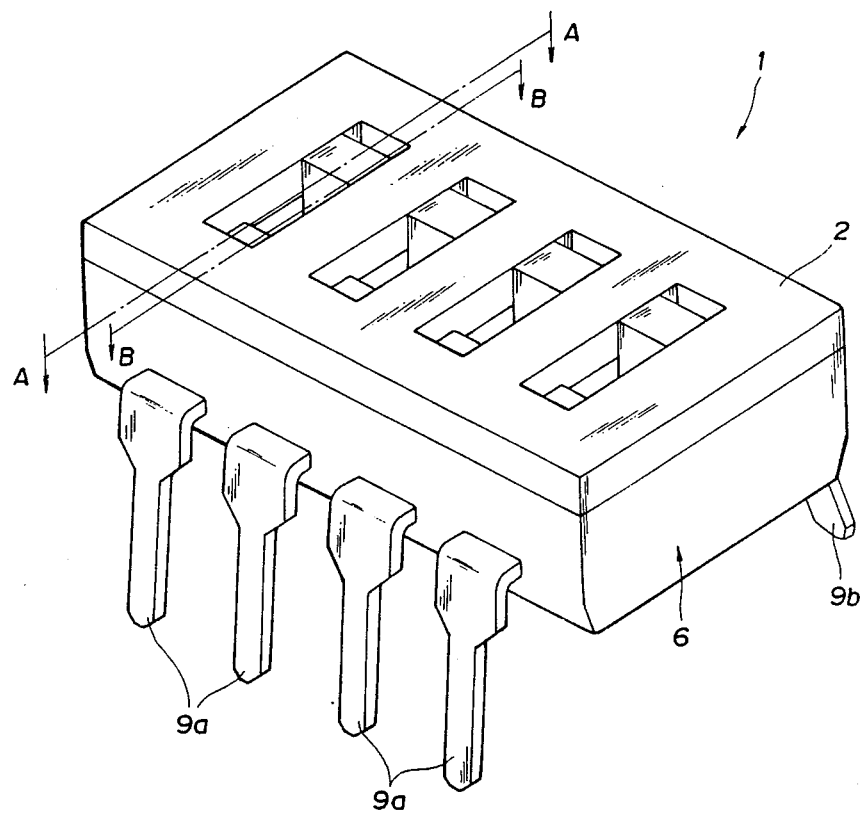
FIG. 1 is a perspective view of the slide switch according to the present invention, this view being relevant to all the preferred embodiments thereof which will be disclosed.

The present invention will now be described with reference to the preferred embodiments thereof, and with reference to the appended drawings. FIG. 1 is a general perspective view which is relevant to all the preferred embodiments of the slide switch according to the present invention. In this figure, the shown slide switch, which in fact is a set of four individual slide switch assemblies housed in one housing, is designated by the reference numeral 1, and the four individual slide switch assemblies are all held side by side in parallel in a housing 6 which is covered over by a cover plate 2; both this housing 6 and this cover plate 2 may be made of synthetic resin. Four terminals 9a extend from one side of this housing 6, one for each of the individual slide switches, and four other terminals 9b extend from the other side of the housing 6, one again for each of the individual slide switch assemblies, but only one of these terminals 9b can be seen in FIG. 1.

Figure 2:
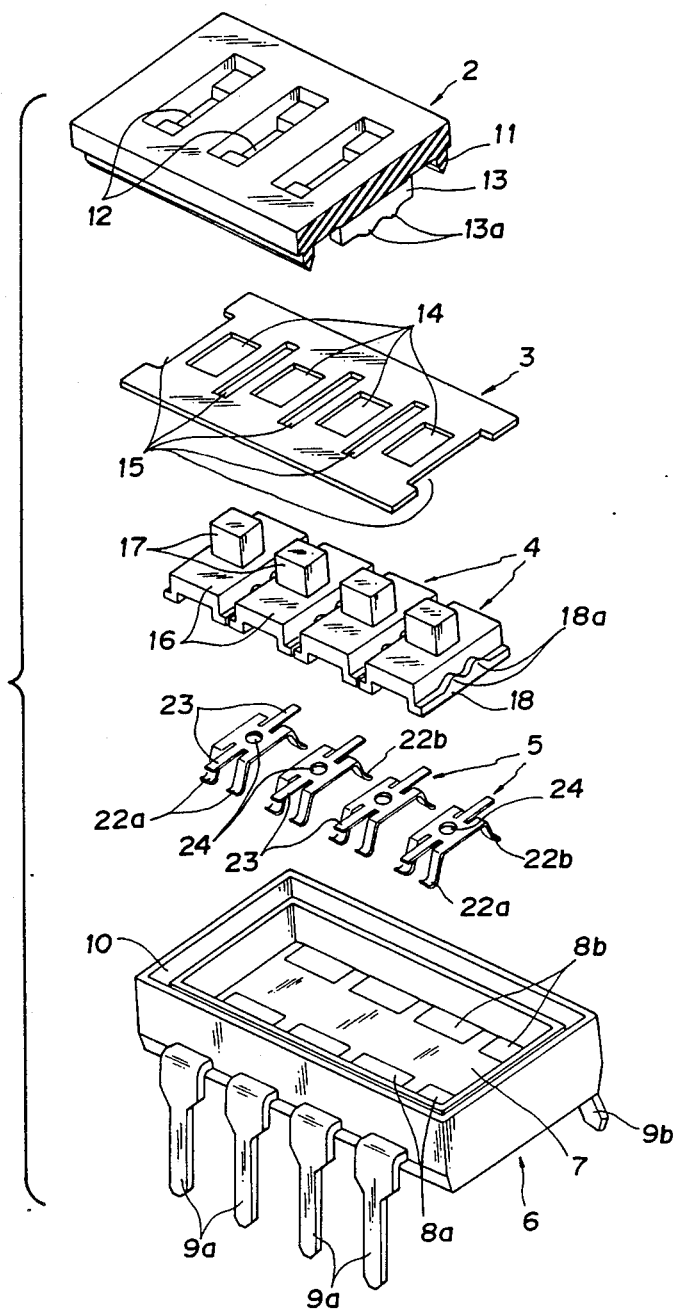
FIG. 2 is an exploded perspective view of the first preferred embodiment of said slide switch of the present invention, with part of a cover plate cut away.
Figure 3:
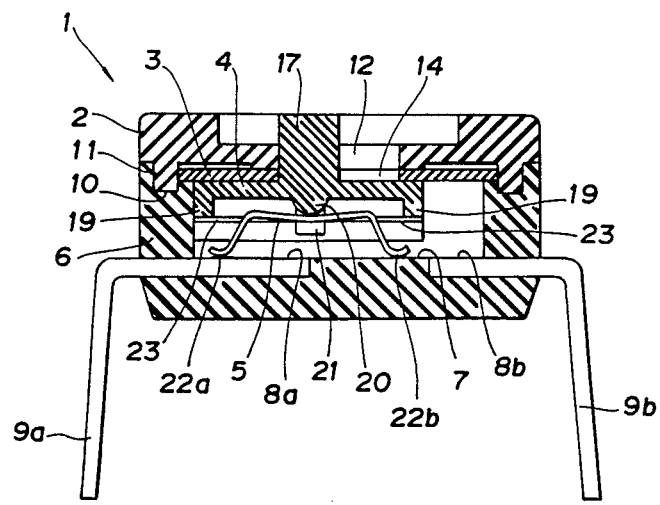
FIG. 3 is a sectional view through said first preferred embodiment of said slide switch of the present invention, taken in a plane indicated by the arrows A—A in FIG. 1.
Figure 4:
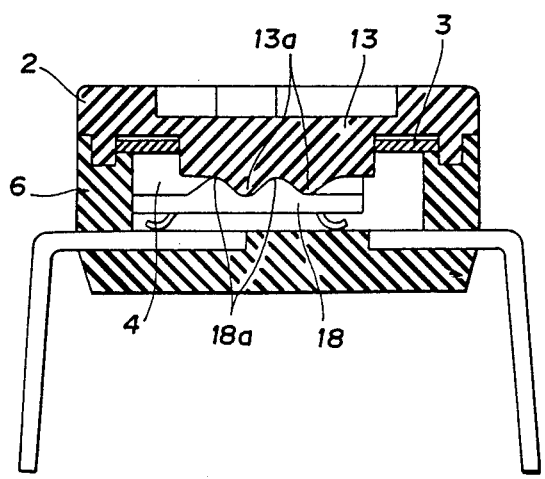
FIG. 4 is another sectional view through said first preferred embodiment of said slide switch of the present invention, taken in a plane as indicated by the arrows B—B in FIG. 1, somewhat different from the plane of FIG. 3.

FIG. 2 shows in exploded perspective view the first preferred embodiment of the slide switch of the present invention, with part of the cover plate 2 cut away, and FIG. 3 is a sectional view through this first preferred embodiment slide switch taken in a plane indicated by the arrows A—A in FIG. 1, while FIG. 4 is another sectional view through said first preferred embodiment taken in a parallel but somewhat different and spaced apart plane as indicated by the arrows B—B in FIG. 1. In FIG. 2, it can be seen that the casing 6 is formed generally as a box with an open top, while the cover plate 2 constitutes a lid for this open top; and thus a fitting groove 10 is provided around the upper edge of the casing 6, while a corresponding linear projection 11 is formed around the edge of the lower surface of the cover plate 2 for being fitted into this fitting groove 10 and for thus securely indexing said cover plate 2 with respect to said casing 6. At the last stage of assembly of this slide switch, this linear projection 11 is welded into the fitting groove 10 by the use of an ultrasonic welding device, and accordingly, in this first preferred embodiment of the present invention, the edge of the linear projection 11 is formed as a sharp edge, for providing a sufficient amount of welding material.

On the inner bottom surface of the box shape of the casing 6 there are provided four pairs of fixed contacts 8a, 8b—one pair for each of the individual slide switch assemblies—and these fixed contacts 8a and 8b are positioned with their upper surfaces flush with said bottom surface of the box shape of the casing 6 and are inserted and fixed therein by a type of insert molding process. The fixed contacts 8a are electrically connected to and may be integrally formed with the abovementioned projecting terminals 9a of the slide switch and are formed as somewhat long in the direction of the line joining these contacts 8a with their corresponding contacts 8b, and the other fixed contacts 8b are electrically connected to and may be integrally formed with the projecting terminals 9b but on the other hand are somewhat shorter in said direction. The cover member 2 is formed with four slot shaped slide holes 12 (only three of them can be seen in FIG. 2 because the fourth is on the portion of the cover member 2 which has been cut away in that figure), each of which opposes a pair of the fixed terminals 8a, 8b and extends parallel to the line joining them. As visible in the sections of said cover member 2 shown in FIGS. 2 and 4, in this first preferred embodiment of the slide switch of the present invention between each pair of said slots 12, as well as at each end of the row thereof, the lower or inner surface of the cover member 2 is formed with a ridge 13 extending along the long sides of said slots 12 which has two bumps 13a facing downwards in the figure formed on it; these ridges 13 and bumps 13a are for providing a detent or ON/OFF indexing action for strikers or slide members 4 of the slide switch as will be described later, and are also for providing a defrictioning action for said slide members 4 as will also be described later.

A seal member 3 is made of rubber or a similar suitable substance and is fixed to the inner or lower side of the cover plate 2 with a suitable adhesive. This seal member 3 is formed with apertures 14 shaped and dimensioned identically to and corresponding to the slots 12, and is also formed with slots 15 dimensioned identically to sections of the ridges 13, for allowing said ridges 13 to protrude through said slots 15 towards the inside space within the casing 6 of the slide switch.

Four strikers or slide members 4 are provided—one for each of the individual slide switch assemblies—which may be made of synthetic resin, and each of these slide members 4 is formed with a projecting push portion 17 which extends upwards in FIG. 2 and is adapted, when the slide switch is assembled, to pass through the corresponding one of the apertures 14 of the seal member 3 and through the corresponding one of the slide holes 12 in the cover plate 2. The push portions 17 are so shaped and sized that, in this condition, their upper surfaces lie substantially flush with the upper surface of the cover plate 2, for good operability of the slide switch without allowing there to exist substantial risk of accidental operation thereof. And the slide members 4 are further formed with fairly large main portions which have smooth upper surfaces 16, so that, whatever position any one of the slide members 4 is slidingly positioned to with respect to the seal member 3 and the cover plate 2 with its push portion 17 sticking through its corresponding said apertures 14 and 12 thereof, either to the switch OFF position or to the switch ON position which, as will be seen shortly, are the extreme travel positions thereof, said upper surface 16 of said slide member 4 completely covers and blocks all of said aperture 14 of said seal member 3. This is important for maintaining the sealing action of the seal member 3 at all times. Each of the slide members 4 is formed on the sides of its said main portion with projecting ribs 18 which have two bumps 18a facing upwards in the figure formed on them; these ribs 18 and bumps 18a are for sliding against the above described ridges 13 and bumps 13a of the cover plate 2, which confront and contact them, and for thus providing the aforesaid detent or ON/OFF indexing action for the slide members 4, as well as for providing a defrictioning action for said slide members 4 as will be described later. And the lower surfaces of the slide members 4 are formed, as can best be seen in the FIG. 3 section which shows that the longitudinal section of each said lower surface is C-shaped, with transverse end ribs 19, 19 at each of their ends, with a central transverse rib 20 somewhat lower in height than said transverse end ribs 19, and with an engagement pin 21 projecting downwards in the figure from the center of said central transverse rib 20.

Four movable contacts 5—one for each of the individual slide switch assemblies—are provided, and are made of an electroconductive material such as spring steel or the like. These are all similar, and are of a somewhat complicated shape which will now be described. Each has a base portion of a generally rectangular shape, through the center of which is pierced a circular hole 24 of substantially the same diameter as the fixing pin 21 of the slide member 4 corresponding thereto. From the center of each end (in the longitudinal direction of the movable contact 5) of the base portion, there extends a support spring portion 23 in the general plane of said base portion of said movable contact 5. And from each of the corners of the base portion of each of the movable contacts 5 there extends in the direction generally perpendicular to said base portion thereof a spring contact leg, the two of said spring contact legs at one end of the base portion being denoted as 22a in the figures and the two of said spring contact legs at the other end of the base portion being denoted as 22b. And the end remote from the base portion of the movable contact 5 of each of these spring contact legs 22a, 22b is curled round so as to present a smooth and curved contact surface. In fact, the two spring contact legs 22a are not exactly parallel to the other two spring contact legs 22b, but are inclined outwards somewhat therefrom, so that the legs 22a, 22b of the movable contact 5 are somewhat splayed out with regard to its longitudinal direction.

Each of these movable contacts 5 is fitted with its central hole 24 fitting over the fixing pin 21 of its corresponding slide member 4, resting in said C-shaped longitudinal section of said lower surface of said slide member 4, with said fixing pin 21 being subsequently crimped so as to reliably and firmly hold said movable contact 5 on said slide member 4. In this position, the movable contact 5 is in contact with the central rib 20 of the slide member 4 along its central transverse line, and also the end of each of the support spring portions 23 contacts the central portion of its corresponding end rib 19, with said support spring portions 23 being slightly bent so as to be in a state of strain; and thereby each side of said movable contact 5 is supported by the slide member 4 effectively at three points, thus being held by a tripod support which is positive and effective and stabilizes its attitude. And the portions of the legs 22a, 22b where they are bent out of the general plane of the base portion of the movable contact 5, which inevitably project somewhat in the direction opposite to the basic direction of the legs 22a, 22b due to the nature of the bending or stamping process, are accomodated in the recesses of the aforesaid C-shaped longitudinal section of said lower surface of said slide member 4, between the ribs 19, 19 and the central rib 20 on said lower surface; and accordingly the bending to and fro to a limited extent of the legs 22a, 22b is not interfered with.

Thus, when the slide switch is to be assembled, then, after these movable contacts 5 have thus been fixed onto the lower surfaces of the slide members 4, these slide members 4 with affixed movable contacts 5 are placed in appropriate places in the box shape of the casing 6, and the cover plate 2 with the seal member 3 adhered by adhesive to its lower surface is moved to approach to the upper opening of said box shape of said casing 6 and is pushed thereagainst, with the projecting push portions 17 of the slide members 4 projecting through the apertures 14 of the seal member 3 and through the slots 12 of the cover plate 2, so that the ribs 18 and bumps 18a on the slide members 4 rest against the ridges 13 and bumps 13a of the cover plate 2, and with the linear projection 11 of the cover plate 2 fitting into the fitting groove 10 of the casing 6. As this is done, the slide members 4 and movable contacts 5 are somewhat squeezed and crushed between the upper side of the bottom of the casing 6 and the lower surface of the seal member 3, so that the legs 22a, 22b of the movable contacts 5 are somewhat bent and splayed outwards in the longitudinal direction; this bending action causes a certain force to be thereafter constantly exerted by the spring member 5 on the slide member 4 in the direction upwards in the figure to force it against the lower surface of the seal member 3 and the cover plate 2, said force being largely transmitted by the support spring portions 23 pressing against the end ribs 19 on the lower side of said slide member 4, thus ensuring a good sealing action for the seal member 3, and holding the slide member 4 securely in place. And then the slide switch is permanently closed up, by an ultrasonic welding device being applied to the joining portion between the cover plate 2 and the casing 6 so as to melt the linear projection 11, or at least the sharp edge portion thereof, into the fitting groove 10.

Now, during use of this slide switch, when any one of the slide members 4 is in its position towards its fixed contact 8a and away from its fixed contact 8b, as shown in section in FIGS. 3 and 4, then the one bent leg 22a of the movable contact 5 fixed to this slide member 4 is in contact with the relevant fixed contact 8a, while on the other hand the other bent leg 22b thereof is not in contact with the other relevant fixed contact 8b. Accordingly, no electrical connection is provided between the fixed contacts 8a and 8b, and therefore no electrical connection exists between the terminals 9a and 9b of this one of the individual slide switch assemblies. In this condition, this individual slide switch assembly is in the OFF state. On the other hand, if this one of the slide members 4 is pushed by its projecting push portion 17 in the direction away from its fixed contact 8a and away from its fixed contact 8b, then it moves the movable contact 5 fixed to said slide member 4 with it, and while said one bent leg 22a of said movable contact 5 remains in contact with the relevant fixed contact 8a, the other bent leg 22b thereof comes to be put into contact with the other relevant fixed contact 8b. Accordingly, now an electrical connection comes to be provided between the fixed contacts 8a and 8b, via the electrically conducting movable contact 5, and therefore electrical connection now exists between the terminals 9a and 9b of this one of the individual slide switch assemblies. In this condition, this individual slide switch assembly is in the ON state.

Now, in this switching action, for each individual slide switch assembly, when it is in its said OFF state, then as shown in FIG. 4 the bumps 18a on the ribs 18 of said slide member 4 fit one between and one on one side of one of the bumps 13a on the corresponding ridge 13 of the cover plate 2, and, since said rib 18 and said ridge 13 are being pressed together by the biasing spring action of the legs 22a, 22b of the movable contact 5, thereby this engagement between the bumps 18a and the bumps 13a provides a detent action to keep the slide member 4 in the shown position, thus keeping this individual slide switch assembly in its said OFF state. Also, when this individual slide switch assembly is shifted to be in its said ON state, then (this is not shown in any figure) the bumps 18a on the ribs 18 of said slide member 4 are shifted, so as still to fit one between and one on one side of one of the bumps 13a on the corresponding ridges 13 of the cover plate 2 but in an interchanged fashion from the previous situation, and similarly to the previous case this engagement between the bumps 18a and the bumps 13a provides detent action to keep the slide member 4 in this position, thus keeping this individual slide switch assembly in its said ON state. And, to switch the individual slide switch assembly between its said OFF and ON states, it is necessary for the operator to apply a certain fairly substantial force on the slide member 4 in the longitudinal direction thereof, in order to overcome the biasing spring action of the legs 22a, 22b of the movable contact 5 and to bend these legs 22a, 22b some more, in order to somewhat move the slide member 4 away from the cover plate 2, thus allowing room for the bumps 18a on the ribs 18 of said slide member 4 to ride past the bumps 13a on the corresponding ridge 13 of the cover plate 2.

According to the shown construction, when the slide switch has been attached to a printed circuit board and is thereafter being cleansed with cleansing liquid, even though some of this liquid may come to rest around the inner peripheries of the slots 12 in the cover member 2, provided that the individual slide switch assemblies are in either their ON or their OFF positions, then because the upper surfaces 16 of the slide members 4 are being pressed against the relevant parts of the cooperating lower surface of the seal member 3 by the spring action of the legs 22a, 22b of the movable contacts 5, a good seal is made therebetween, and it is positively prevented that such cleansing fluid can enter to within the slide switch casing 6. Accordingly contamination of the slide switch mechanism by cleansing fluid is effectively prevented.

Further, when the slide switch is being soldered to the printed circuit board as described above, then it is likely that some heat will be transferred to the terminals 9a and 9b due to their being soldered also. However, there is no danger that this heat can be transmitted to the seal member 3 to a sufficient extent to damage it, because of the interposition of the slide members 4, which are capable of moderating this heat to a great extent. Accordingly, the seal member 3 cannot be damaged or deformed during the soldering process by the action of heat, and accordingly the durability of the sealing effect for the slide switch is guaranteed.

As previously mentioned, when the individual slide switch assemblies are in either their ON or their OFF positions, then the upper surfaces 16 of the slide members 4 are being pressed against the relevant parts of the cooperating lower surface of the seal member 3 by the spring action of the legs 22a, 22b of the movable contacts 5, and a good seal is being made therebetween. Now, since typically the material of the seal member 3 is a material which provides a high frictional coefficient for a cooperating member, such as rubber, then this might be considered to cause some problem in terms of preventing the smooth sliding of the slide members 4 to switch the individual slide switch assemblies, or because rumpling or even peeling off of the seal member 3 as it is adhered to the under side of the cover plate 2 might occur. However in the shown construction, this does not occur. This is an important feature of the shown first preferred embodiment of the present invention. This is because, when the individual slide switch assembly is to be moved from one of its said OFF and ON states to the other, and when in order to do this the operator applies a certain fairly substantial force on the slide member 4 in the longitudinal direction thereof for switching purposes, then as the switching action is started, by the above described action of the bumps 18a on the ribs 18 of the slide member 4 riding past the bumps 13a on the corresponding ridges 13 of the cover plate 2, the slide member 4 is moved away from the cover plate 2 against the biasing spring action of the legs 22a, 22b of the movable contact 5 which is overcome, and this causes the frictional engagement between the upper surface 16 of the slide member 4 and the cooperating lower surface of the seal member 3 to be broken, thus rendering friction between these surfaces nonexistent. Accordingly no resistance is opposed to the switching action of the individual slide switch assembly by such friction, and rumpling of the seal member 3 against the under side of the cover plate 2, or peeling off thereof, cannot occur. This friction relieving action, in this first preferred embodiment associated with the detent mechanism of the individual slide switch assemblies, is very helpful for allowing good sealing action to be provided for the slide switch of the present invention; however, it is not essential to the present invention, and if the seal member 3 is made of a low friction material such as nylon or the like, such a friction relieving action may be dispensed with, in an alternative embodiment, and it may be practiced for the upper surfaces 16 of the slide members 4 and the cooperating portions of the lower surface of the seal member 3 to slide against one another during the shifting of the individual slide switch assemblies between their ON and their OFF states.

Thus, according to the shown structure, because the seal member 3 is interposed between the internal side of the cover plate 2 and the side of the slide members 4 facing it, thereby said seal member 3 is squeezed between said slide members 4 and said cover plate 2, and accordingly a seal is produced between the inside of the casing of the slide switch and the outside, more specifically between the sides of the slide members 4 facing the cover plate 2 and the peripheries of the apertures 14 in said cover plate 2 through which the push portions 17 of said slide members 4 project. Thereby, because the slide switch itself has a good and effective seal structure, it is not liable to entry of cleansing fluid or contaminants, when a printed circuit board to which it is mounted is being cleansed, and accordingly it is not liable to contamination of the contacts 8a and 8b and the contact portions of the legs 22a, 22b of the movable contacts 5 occurring during such cleansing, without requiring the application of any separate member or seal system to it for keeping out cleansing fluid from its interior during cleansing. Further, this seal structure is not liable to deformation or damage due to heat transferred to it, when said slide switch is being soldered to a printed circuit board, due to the fact that the slide members 4 are interposed between the seal member 3 and the fixed contacts 8a and 8b which are connected to the terminals 9a and 9b. Accordingly, the slide switch is not liable to deformation of any of its contact members, and also does not require too much switching force for its operation. Thus, it has good operability. Further, this slide switch is easy and economical to manufacture, is cheap to use, and is reliable.

It should be understood that, although in the shown first preferred embodiment the seal member 3 is large enough for its sealing effect to be provided in any case, no matter what are the positions of the various slide members 4 of the individual slide switching assemblies, this is not essential to the present invention, and in an alternative construction it would be possible for the seal member 3 to be smaller, so that, in the case of each of the individual slide switching assemblies, a sealing effect was only available when it was in a particular switched position, either ON or OFF as the case might be. This would be a reasonably serviceable construction, although its sealing performance is more limited than that of the first preferred embodiment discussed above, because as explained above the sealing effect for the slide switch is required for protecting it from the ingress of cleansing fluid, when a printed circuit board with said slide switch attached thereto is being cleansed after soldering. Since during the manufacturing process of an electronic device including the slide switch it is acceptable for the individual slide switching assemblies of said slide switch to be arbitrarily positioned, the desired sealing effect may be available during manufacture with such a limited sealing construction also.

Figure 5:
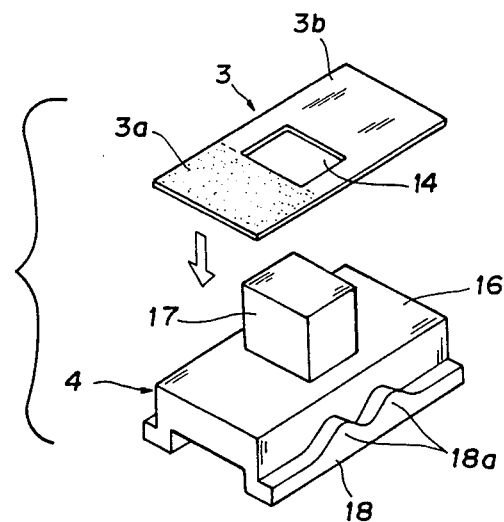
FIG. 5 is a perspective view of a slide member and a marked seal member therefor incorporated in the second preferred embodiment of the slide switch of the present invention.
Figure 6:
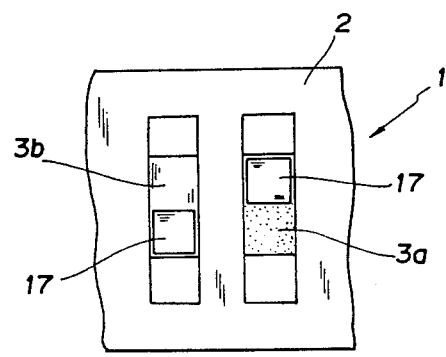
FIG. 6 is a partial plan view of said second preferred embodiment of the slide switch of the present invention.

In FIG. 5, one of the slide members 4 of the second preferred embodiment of the present invention is shown, along with a seal member 3 therefor. In the description of this second preferred embodiment, and in the figures, like parts to those of the first preferred embodiment will be denoted by like reference numerals; and description of structures which are the same as ones of the first preferred embodiment will be omitted. In this second preferred embodiment, each slide member 4 has its own seal member 3, which is attached to the upper face 16 of said slide member 4 rather than to the lower face of the cover plate 2 as in the first preferred embodiment, and further the upper faces of each of said seal members 3 are colored differently on the two opposite sides of the push portion 17 of the corresponding slide member 4—as a black portion 3a and a white portion 3b, as shown in the figure, for instance. Thus, when these slide members 4 and seal members 3 are assembled into the slide switch as a whole, then by viewing the cover plate 2 of said slide switch, as shown in FIG. 6, it is possible to see which of the individual slide switch assemblies is in the ON position and which is in the OFF position, by inspection of whether the black portion 3a of each of the seal members 3 or the white portion 3b thereof is visible. And in this second preferred embodiment, a sealing effect similar to that available in the case of the first preferred embodiment is available, but via a reversed form of construction.

Figure 7:
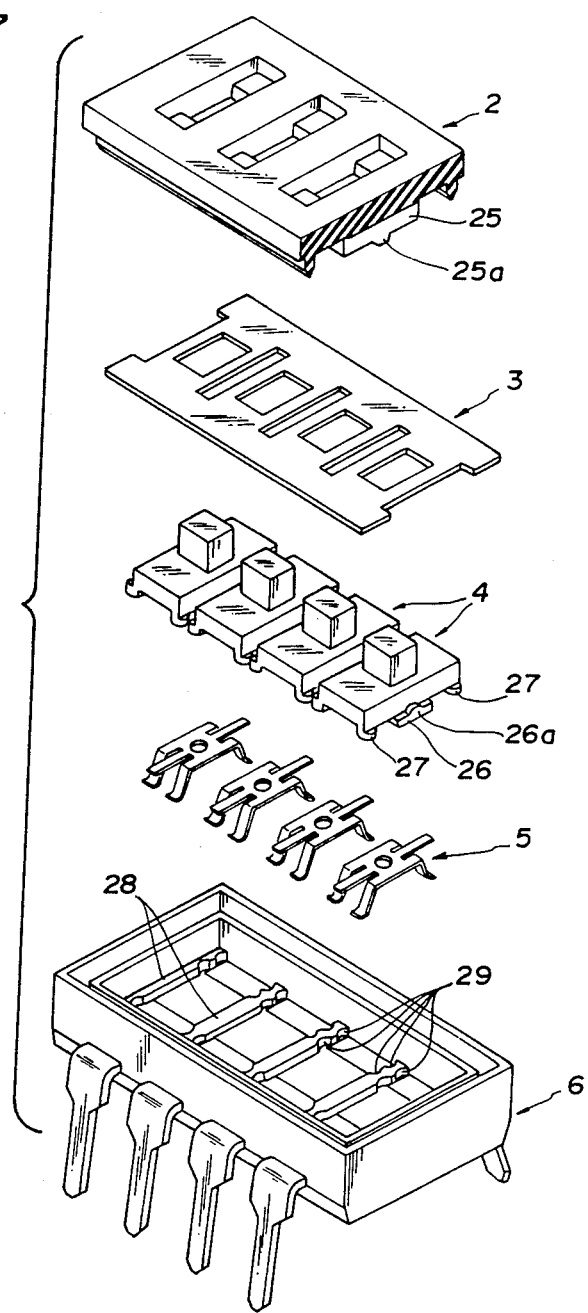
FIG. 7 is an exploded part cut away perspective view, similar to FIG. 2, showing the third preferred embodiment of the slide switch of the present invention.

In FIG. 7, the third preferred embodiment of the present invention is shown in an exploded fashion similar to FIG. 2. In the description of this third preferred embodiment, and in the figures, like parts to those of the first preferred embodiment will be denoted by like reference numerals; and description of structures which are the same as ones of the first preferred embodiment will be omitted. In this third preferred embodiment, the detent mechanisms for retaining the slide members 4 at either their ON or their OFF positions are provided by separate constructions from the friction relieving mechanisms for displacing the slide members 4 away from their contact with the seal member 3 during transition between these ON or OFF positions.

In detail, the structure for the friction relieving mechanism for displacing the slide members 4 away from their contact with the seal member 3 during transition between these ON or OFF positions is quite similiar to that used in the case of the first preferred embodiment described above, and incorporates ribs 26 formed on the sides of the slide members 4 each formed with a single bump 26 thereon and ridges 25 on the inside surface of the cover 2 on the sides of the slots 12 each also formed with a single bump 25a thereon. This friction relieving mechanism operates similarly to that of the first preferred embodiment, and hence this operation will not be particularly described. However, because the ribs 26, ridges 25, and bumps 26a and 25a are not required to perform any detent function for the slide switch, they may be made much more flimsily than in the case of the first preferred embodiment.

Further, the detent arrangements for retaining the slide members 4 at either their ON or their OFF positions are provided by pairs of projections 27 on the under sides of the slide members 4 (away from the cover plate 2) which slide between ribs 28 formed on the inner bottom surface of the casing 29. These ribs are formed with mutually opposed pairs of dimples 29. When one of the slide members 4 is in an intermediate position between its ON and its OFF positions, then the ends of these projections 27 are not in these dimples 29 but between them, and in this state the projections 27 are bent inwards to a certain extent and are under some stress. But, when on the other hand this slide member 4 reaches its ON or its OFF position, then the ends of these projections 27 fall into a pair of these dimples 29, under the action of the aforesaid stress, and in this state the projections 27 can be bent inwards so as to move the slide member 4 away from its said ON or OFF position only by exerting some considerable force on the slide member 4. Accordingly an appropriate detent action for the motion of the slide members 4 is provided.

Figure 8:
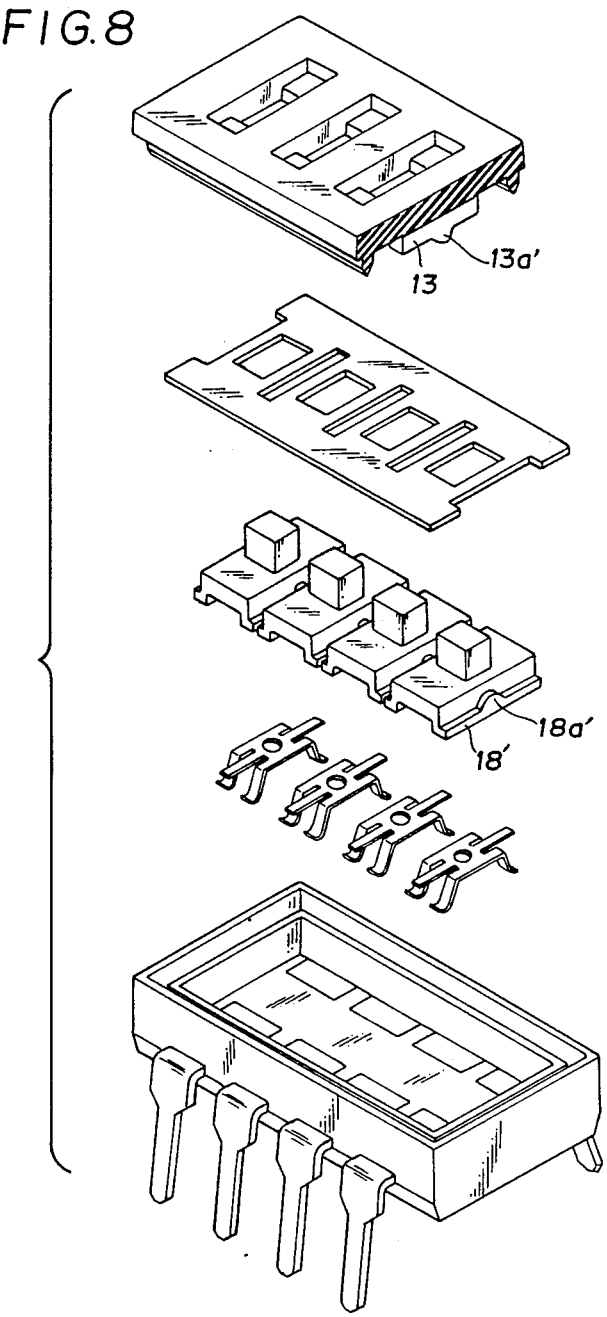
FIG. 8 is an exploded part cut away perspective view, similar to FIGS. 2 and 7, showing the fourth preferred embodiment of the slide switch of the present invention.

In FIG. 8, the fourth preferred embodiment of the present invention is shown in an exploded fashion similar to FIG. 2. In the description of this fourth preferred embodiment, and in the figures, like parts to those of the first preferred embodiment will be denoted by like reference numerals; and description of structures which are the same as ones of the first preferred embodiment will be omitted. In this fourth preferred embodiment, the detent mechanisms for retaining the slide members 4 at either their ON or their OFF positions and the friction relieving mechanisms for displacing the slide members 4 away from their contact with the seal member 3 during transition between these ON or OFF positions are provided by the same constructions, as in the first preferred embodiment of FIGS. 1 through 4; the only difference is that only one bump 13a on each of the ridges 13, and only one cooperating bump 18a on the ribs 18, is provided. This embodiment will still function well, and has the advantage that less accuracy of construction of the ridges 13 with their bumps 13a and of the ribs 18 with their bumps 18a is required. In other words, in the case of the first preferred embodiment of FIGS. 1 through 4, any slight inaccuracy of construction of the ridges 13 with their bumps 13a or of the ribs 18 with their bumps 18a, either with regard to the separation of the two bumps 13a or the two bumps 18a, or with regard to the height of any one or more of them, can cause some play in the detent mechanism for the relevant slide switching assembly; but in this fourth preferred embodiment the accurate operation of the detent mechanism is much less sensitively dependent upon accurate formation of these members 13, 13a, 18, and 18a.

Figure 9:
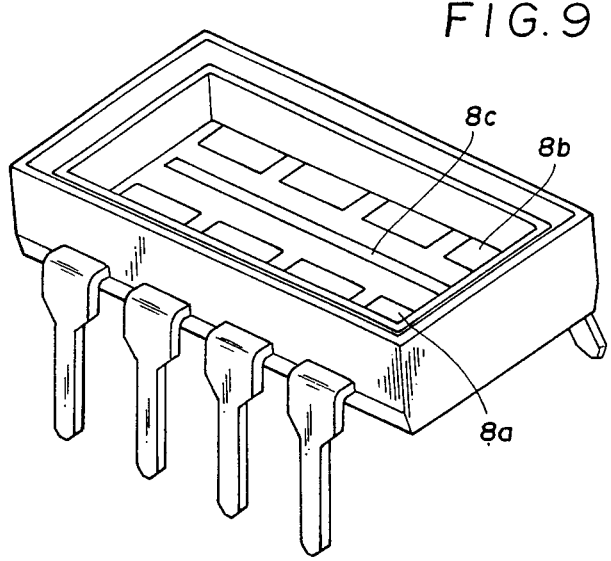
FIG. 9 is a perspective view, similar to a part of FIGS. 2 and 7, showing only the casing of a slide switch which is the fifth preferred embodiment of the present invention.

In FIG. 9, the casing and fixed contacts and terminals only of a fifth preferred embodiment of the present invention are shown in perspective view. In the description of this fifth preferred embodiment, and in the figures, like parts to those of the first preferred embodiment will be denoted by like reference numerals; and description of structures which are the same as ones of the first preferred embodiment will be omitted. In this fifth preferred embodiment, there are provided for each individual slide switching assembly three fixed contacts: two outer fixed contacts 8a and 8b as before, and a common central fixed contact 8c which is common to all the individual slide switching assemblies. Corresponding to this central contact 8c, a terminal 9c is provided for it and projects to the outside of the slide switch, but this terminal 9c is not shown in the drawing. Each of the individual slide switching assemblies in this fifth preferred embodiment acts as a two way switch, so that the movable contact 5 thereof can connect the common terminal 9c either to the terminal 9a or the terminal 9b, according to the positioning of the push portion 17 of the slide member 4 thereof. Corresponding to this, the dimensions of the various parts in the case of this fifth preferred embodiment are somewhat different, but the details will be easily supplemented by one of ordinary skill in the relevant art, based upon the descriptions herein.

Figure 10:
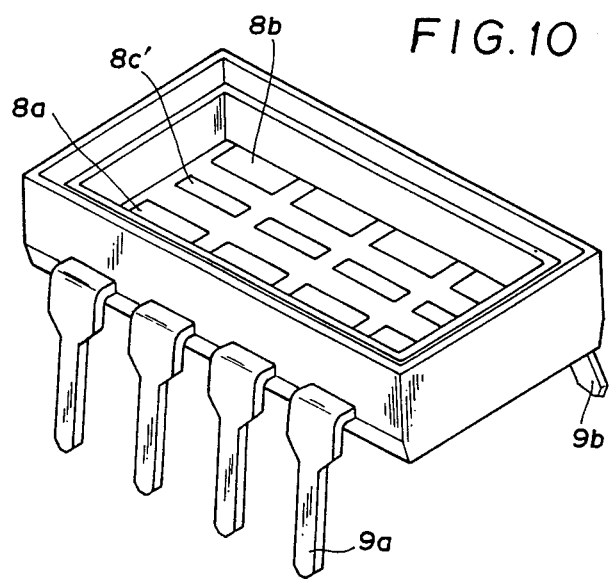
FIG. 10 is a perspective view, similar to FIG. 9, showing only the casing of a slide switch which is the sixth preferred embodiment of the present invention.

In FIG. 10, the casing and fixed contacts and terminals only of a sixth preferred embodiment of the present invention are shown in perspective view. In the description of this sixth preferred embodiment, and in the figures, like parts to those of the fifth preferred embodiment will be denoted by like reference numerals; and description of structures which are the same as ones of the first preferred embodiment will be omitted. In this sixth preferred embodiment, there are again provided for each individual slide switching assembly three fixed contacts: two outer fixed contacts 8a and 8b as before, and a central fixed contact 8c, which in this case now is not common to all the individual slide switching assemblies, but is individually provided for each of them. Corresponding to each of these central contacts 8c, again a terminal 9c is provided for it and projects to the outside of the slide switch, but this terminal 9c is not shown in the drawing. Each of the individual slide switching assemblies in this fifth preferred embodiment acts as a separate two way switch, so that the movable contact 5 thereof can connect the terminal 9c thereof either to the terminal 9a or the terminal 9b, according to the positioning of the push portion 17 of the slide member 4 thereof. Again, the dimensions of the various parts in the case of this sixth preferred embodiment are rather as in the case of the fifth preferred embodiment.

Figure 11:
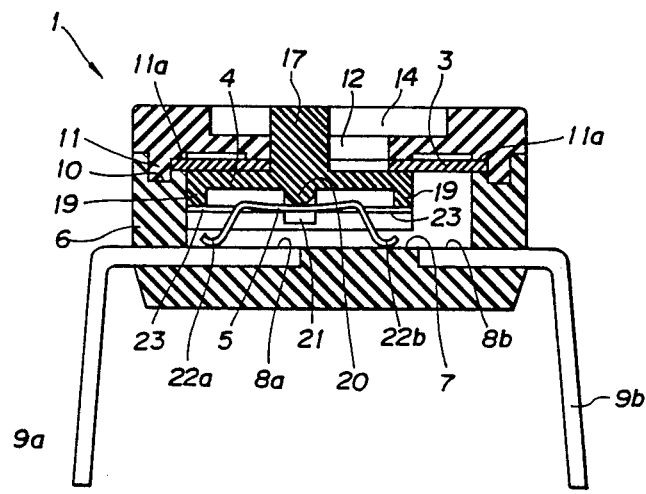
FIG. 11 is a sectional view, similar to FIG. 3, of a slide switch which is the seventh preferred embodiment of the present invention, taken in a plane which corresponds to the plane of FIG. 3 relating to the first embodiment.
Figure 12:
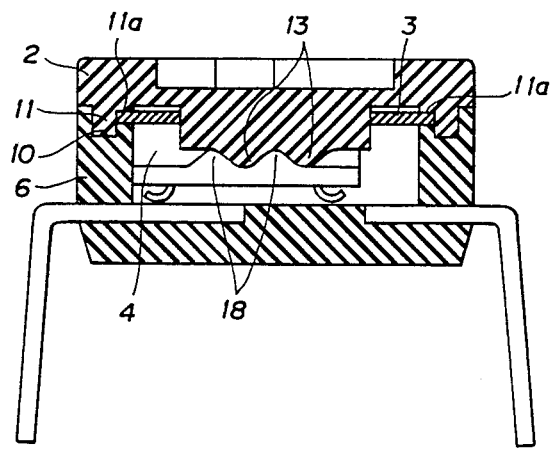
FIG. 12 is a sectional view, similar to FIG. 4, of said seventh preferred embodiment of the slide switch of the present invention, taken in a plane which corresponds to the plane of FIG. 4 relating to the first embodiment.

In FIG. 11 there is shown a sectional view, similar to FIG. 3, of a slide switch which is the seventh preferred embodiment of the present invention, taken in a plane which corresponds to the plane of FIG. 3 relating to the first embodiment, and in FIG. 12 there is shown a sectional view, similar to FIG. 4, of said seventh preferred embodiment of the slide switch of the present invention, taken in a plane which corresponds to the plane of FIG. 4 relating to the first embodiment. In the description of this seventh preferred embodiment, and in the figures, like parts to those of the first preferred embodiment will be denoted by like reference numerals; and description of structures which are the same as ones of the first preferred embodiment will be omitted. In this seventh preferred embodiment, the outer edge of the seal member 3 is clamped and held between a step 11a formed on the inner side of the linear projection 11 formed on the outer edge of the cover plate 2 and a corresponding portion of the upper edge of the casing 6 of the slide switch. According to this particular structure, because substantially the whole outer periphery of the seal element 3 is held tightly and positively, even if any failure of the sticking of said seal element 3 to the inner lower surface of the cover plate 2 should occur, nevertheless the seal element 3 will not be displaced, and its sealing effect will not be lost. Further, no separate seal member or gasket is required for sealing between the cover plate 2 and the casing 6 of the slide switch. Thereby, the manufacturing process is simplified and rendered less costly.

Figure 13:
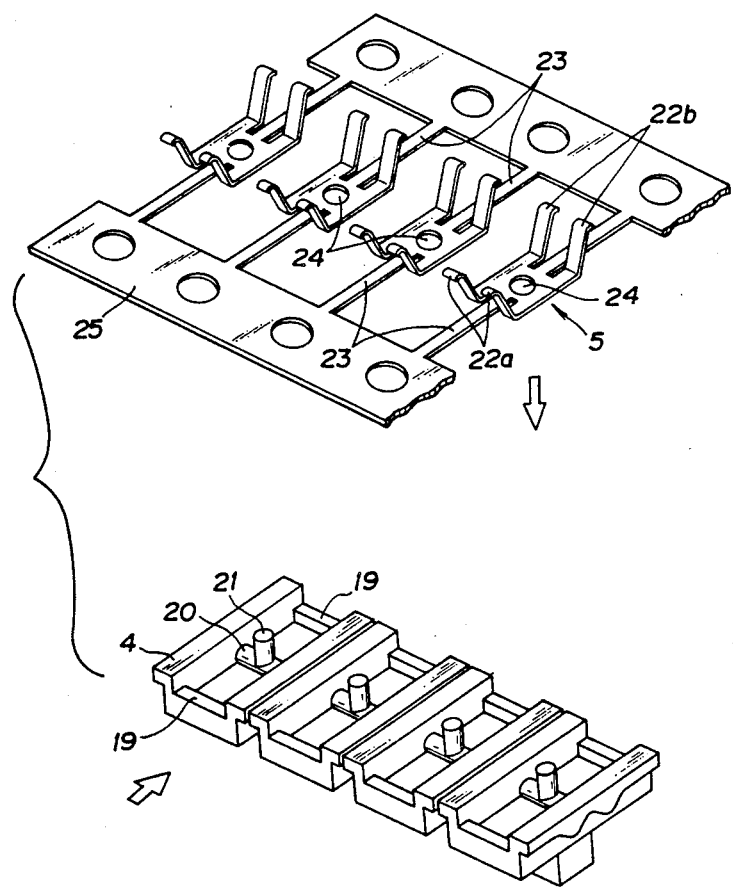
FIG. 13 is a perspective view showing a particular convenient process for manufacturing certain movable contacts and coupling them to certain slide members, in a concurrent fashion.

FIG. 13 shows how the movable contacts 5 may be manufactured and coupled to the slide members 4. The movable contacts 5 are manufactured by punching and press forming a belt like piece of material 25, and the spring portions 23 are left for the moment, after this initial punching and press forming, so as still to couple all the metal pieces together. A required number of the slide members 4 are fed out from a parts feeder in the direction shown in FIG. 13 by the arrow, and then the coupled metal assembly is lowered downwards in the direction shown by the other arrow in that figure, so as to pass the fixing pins 21 of the slide members 4 through the central holes 24 of all the movable contacts 5 at the same time. Then, the ends of these fixing pins 21 are all crimped, and only after this are the spring portions 23 cut, so as to release the movable contacts 5 from one another and thus to separate the coupled combinations of them and the slide members 4. This is a particularly convenient method of multiple concurrent assembly.

Figure 14:
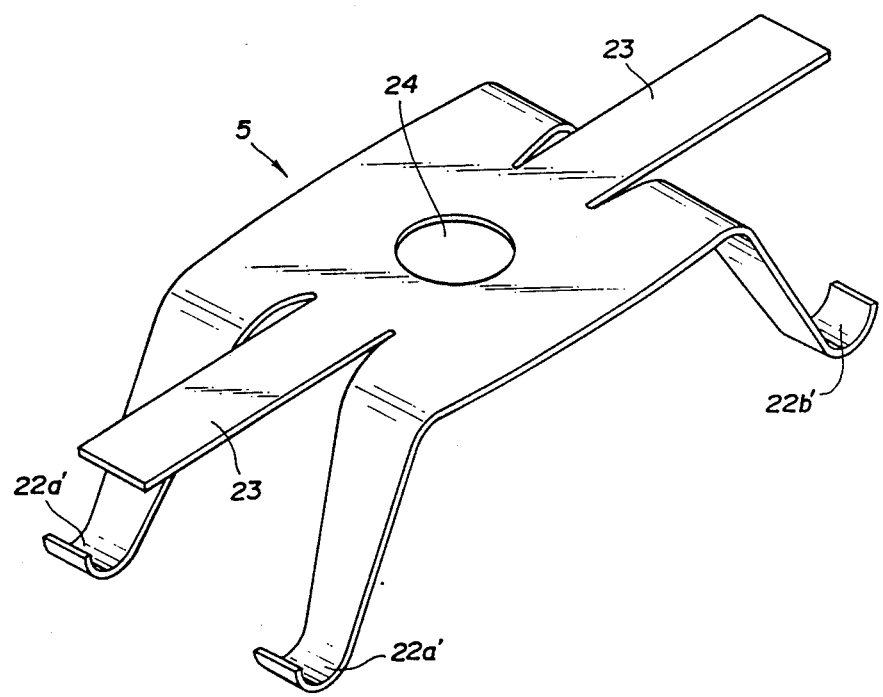
FIG. 14 is a perspective view of a movable contact member of an eighth preferred embodiment of the slide switch of the present invention.

FIG. 14 is a perspective view of a movable contact of an eighth preferred embodiment of the slide switch of the present invention; in this eighth preferred embodiment, and in the figures, like parts to those of the first preferred embodiment will be denoted by like reference numerals; and description of structures which are the same as ones of the first preferred embodiment will be omitted. In this eighth preferred embodiment, the legs 22a and 22b of the movable contact members 5 are tapered towards their bottoms. This construction gives a more progressive effect to the resilient spring performance of these legs 22a and 22b; in other words, as the movable contact member 5 is more and more pressed down, the coefficient by which the spring force provided by the legs 22a and 22b thereof is related to the pressing down amount increases. This provides a good and resilient spring performance to the movable contact members 5, and to the slide switch as a whole.

Figure 15:
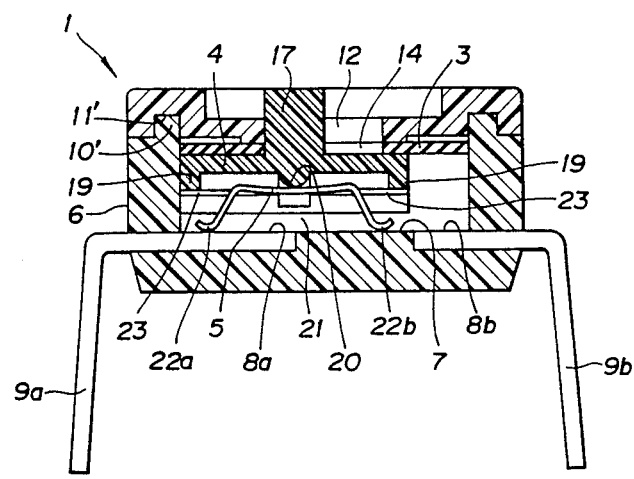
FIG. 15 is a sectional view, similar to FIGS. 3 and 11, of a slide switch which is the ninth preferred embodiment of the present invention, taken in a plane which corresponds to the planes of FIG. 3 and 11 relating to the first and second preferred embodiments.
Figure 16:
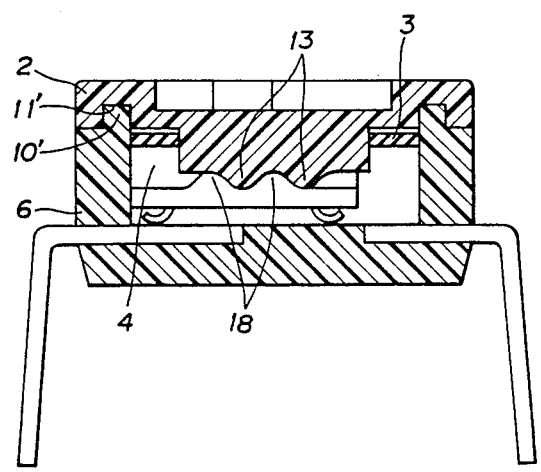
FIG. 16 is a sectional view, similar to FIGS. 4 and 12, of said ninth preferred embodiment of the slide switch of the present invention, taken in a plane which corresponds to the planes of FIG. 4 and 12 relating to the first and seventh preferred embodiments.
Figure 17A:
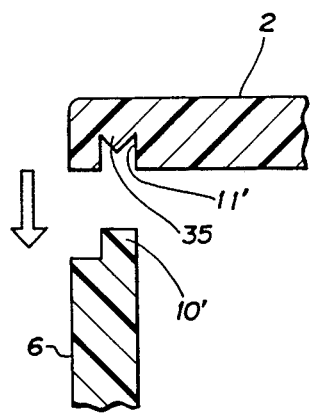
FIGS. 17(a) and 17(b) constitute a set of a "before" and an "after" sectional view of a joining portion of the casing and the cover of said ninth preferred embodiment of the slide switch of the present invention, for showing how said casing and said cover are joined together by ultrasonic welding.
Figure 17B:
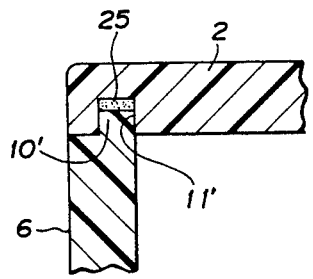

FIG. 15 is a sectional view, similar to FIGS. 3 and 11, of a slide switch which is the ninth preferred embodiment of the present invention, taken in a plane which corresponds to the planes of FIG. 3 and 11 relating to the first and second preferred embodiments; FIG. 16 is a sectional view, similar to FIGS. 4 and 12, of said ninth preferred embodiment of the slide switch of the present invention, taken in a plane which corresponds to the planes of FIG. 4 and 12 relating to the first and seventh preferred embodiments; and FIG. 17 shows in a "before" and an "after" sectional view of a joining portion of the casing and the cover of said ninth preferred embodiment how said casing and said cover are joined together. In the description of this ninth preferred embodiment, and in the figures, like parts to those of the first preferred embodiment will be denoted by like reference numerals; and description of structures which are the same as ones of the first preferred embodiment will be omitted. In this ninth and last preferred embodiment, the joining together of the upper edge of the casing 6 and the outer edge of the cover plate 2 is done in a different way to that of the previous embodiments: a linear projection 10' is provided as extending around the periphery of said upper edge of the casing 6, and a corresponding groove 11' is provided as extending around said outer edge of the cover plate 2 on its lower side. Before these are fitted together, as illustrated in FIG. 17(a), the bottom of the groove 11' is formed with a pointed longitudinal ridge 35. After the slide switch internal components such as the slide members 4 with the movable contacts 5 assembled thereto are arranged within the casing 6, then the cover plate 2 is placed thereon, with the linear projection 10' fitted into the groove 11', and an ultrasonic welder is used thereon. The energy of the ultrasonic welder melts the material of the pointed longitudinal ridge 35, so that, as shown in FIG. 17(b), it fills the bottom of the groove 11' and welds the linear projection 10' thereinto very tightly and securely. There is no risk of any of this molten material escaping, since it is sealed within the groove 11'.

The portion 35 which becomes melted is preferred to be such a sharp edge or pointed ridge, but it may be also of some other shape which is suitable for concentrating the energy of the ultrasonic welder. This fixing construction shown in this ninth preferred embodiment of the present invention is preferable to the fixing construction of the first preferred embodiment, because there is no need to increase the thickness of the wall of the casing 6 only in order to form the groove 11 without sacrificing the strength of said casing wall. According to this embodiment, because the portions of the cover plate 2 surrounding the slots 12 are more or less dead space, and because forming the groove 11' does not compromise the strength of the casing of the slide switch, thereby the slide switch may be made of highly compact design and will have sufficient mechanical strength, as well as the welded portion connecting the cover plate 2 and the casing 6 having sufficient strength.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A slide switch comprising:
 (a) a casing formed in a hollow box shape with an open top;
 (b) a plurality of fixed contacts disposed on an internal bottom surface of said casing;
 (c) a plurality of terminals extending outside of said casing, each one of said terminals being electrically connected to one of said fixed contacts;
 (d) a cover mounted to close said open top of said casing, said cover comprising a hole opposed to said fixed contacts;
 (e) a slide member disposed inside said casing, comprising a control portion protruding out through said hole in said cover;
 (f) a movable contact portion made of a resilient electrically conducting material which has leg portions directed toward said internal bottom surface of said casing such that said movable contact portion is elastically loaded against said internal bottom surface of said casing to thereby produce a biasing force on said slide member to impel it in a direction towards said cover;
 (g) said movable contact portion being slidable with said control portion of said slide member to selectively electrically connect said leg portions of said movable contact portion with said fixed contacts to connect a combination of said fixed contacts with each other; and wherein said terminals are two in number, and said fixed contacts are two in number, said slide switch has the function of a simple switch; and
 (h) a holding means for holding said movable contact portion to prevent movement thereof in any direction within a plane parallel to said internal bottom surface of said casing except in a sliding direction of said slide member.

2. A slide switch as in claim 1, wherein said holding means comprises an elongated spring portion projecting from said movable contact portion and an end rib means supported on said slide member, said end rib means for contacting said elongated spring portion to prevent said movement of said movable contact.

3. A slide switch comprising:
 (a) a casing formed in a hollow box shape with an open top;
 (b) a plurality of fixed contacts disposed on an internal bottom surface of said casing;
 (c) a plurality of terminals extending outside of said casing, each one of said terminals being electrically connected to one of said fixed contacts;
 (d) a cover mounted to close said open top of said casing, said cover comprising a hole opposed to said fixed contacts;
 (e) a slide member disposed inside said casing, comprising a control portion protruding out through said hole in said cover;
 (f) a movable contact portion made of resilient electrically conducting material which has leg portions directed toward said internal bottom surface of said casing such that said movable contact portion is elastically loaded against said internal bottom surface of said casing to thereby produce a biasing force on said slide member to impel it in a direction towards said cover;

(g) said movable contact portion being slidable with said control portion of said slide member to selectively electrically connect said leg portions of said movable contact portion with said fixed contacts to connect a combination of said fixed contacts with each other; and wherein said terminals are three in number, and said fixed contacts are also three in number, and said slide switch has the function of a two way switch; and (h) a holding means for holding said movable contact portion to prevent movement thereof in all directions within a plane parallel to said internal bottom surface of said casing except in a sliding direction of said slide member.

4. A slide switch as in claim 3, wherein said holding means comprises an elongated spring portion projecting from said movable contact portion and an end rib means supported on said slide member, said end rib means for contacting said elongated spring portion to prevent said movement of said movable contact.

5. A slide switch comprising:
(a) a casing formed in a hollow box shape with an open top;
(b) a plurality of fixed contacts disposed on an internal bottom surface of said casing;
(c) a plurality of terminals extending outside of said casing, each one of said terminals being electrically connected to one of said fixed contacts;
(d) a cover mounted to close said open top of said casing, said cover comprising a hole opposed to said fixed contacts;
(e) a slide member disposed inside said casing comprising a control portion protruding out through said hole in said cover;
(f) a movable contact portion made of a resilient electrically conducting material which has leg portions directed toward said internal bottom surface of said casing such that said movable contact portion is elastically loaded against said internal bottom surface of said casing to thereby produce a biasing force on said slide member to impel it in a direction towards said cover;
(g) said movable contact portion being slidable with said control portion of said slide member to selectively electrically connect said leg portions of said movable contact portion with said fixed contacts to connect a combination of said fixed contacts with each other; and wherein a part of said movable contact portion of said slide member which is made of a resilient electrically conducting material and which bears against said internal bottom surface of said casing is tapered; and
(h) a holding means for holding said movable contact portion to prevent movement thereof in all directions within a plane parallel to said internal bottom surface of said casing except in a sliding direction of said slide member.

6. A slide switch as in claim 5, wherein said holding means comprises an elongated spring portion projecting from said movable contact portion and an end rib means supported on said slide member, said end rib means for contacting said elongated spring portion to prevent said movement of said movable contact.

* * * * *